United States Patent

[11] 3,584,858

[72] Inventor Merrill G. Beck
 Erie, Pa.
[21] Appl. No. 819,332
[22] Filed Apr. 25, 1969
[45] Patented June 15, 1971
[73] Assignee Lord Corporation
 Erie, Pa.
 Continuation-in-part of application Ser. No. 511,896, Dec. 6, 1965, now abandoned, and a continuation-in-part of 619,462, Feb. 28, 1967, now Patent No. 3,461,816, and a continuation-in-part of 739,968, May 23, 1968, now Patent No. 3,456,961.

[54] COMPRESSION SPRING
 13 Claims, 19 Drawing Figs.
[52] U.S. Cl...................................................... 267/153
[51] Int. Cl...................................................... F16s 1/36
[50] Field of Search........................................... 267/153,
 152, 140, 141, 143, 145, 182, 63

[56] References Cited
UNITED STATES PATENTS
2,571,281 10/1951 Neher........................... 267/1 (53)
2,765,163 10/1956 Muller.......................... 267/1 (53)

Primary Examiner—James B. Marbert
Attorney—Ralph Hammar

ABSTRACT: A compression spring arrangement comprising a column of elastomer in compression load-carrying relation between supporting and supported members. The column has a relation between length and cross section which prevents buckling under compression load and the supporting and supported members have load-carrying surfaces in opposed relation to each other projecting radially outside the associated end of the column with at least one of the members being bonded to the associated end of the column. The ends of the column diverge outward from the load-carrying surfaces at an acute angle to define a central section between the ends of substantially greater cross-sectional area than the cross-sectional area of the ends in contact with said members at no load. Under compression load, the elastomer bulges or rolls outward into load contact with the load-carrying surfaces outside the bond and increases the load-carrying area of the column presented to the associated load-carrying surfaces. The mounting is characterized by greater load-carrying ability and by a longer life than the same volume of elastomer in a column of the same height but of uniform cross-sectional area through.

PATENTED JUN 15 1971

INVENTOR
Merrill G. Beck

BY Ralph Hammar
ATTORNEY

COMPRESSION SPRING

This application is a continuation-in-part of my applications Ser. No. 511,896, filed Dec. 6, 1965, now abandoned; Ser. No. 619,462, filed Feb. 28, 1967, now U.S. Pat. No. 3,461,816 and Ser. No. 739,968, filed May 23, 1968, now U.S. Pat. No. 3,456,961.

This invention is a bonded elastomeric sandwich compression spring which is characterized by greater load-carrying ability and longer life.

Figure 1:
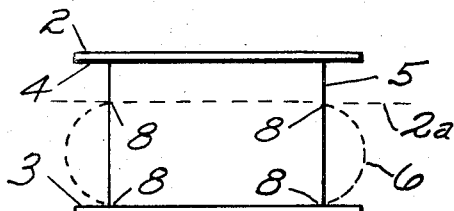
FIG. 1 is a side elevation of a prior-art compression-type mounting.
Figure 3:
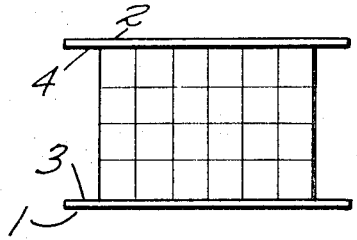
Figure 4:
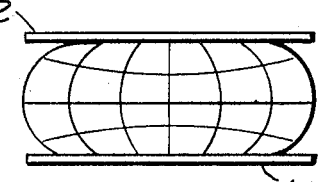
Figure 5:
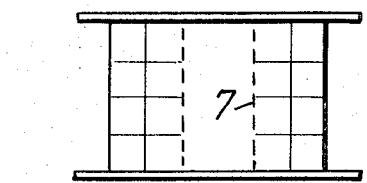
Figure 6:
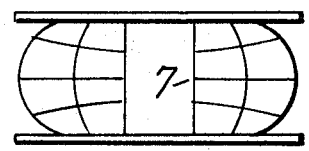
Figure 7:
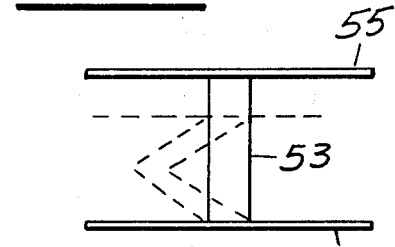
Figure 8:
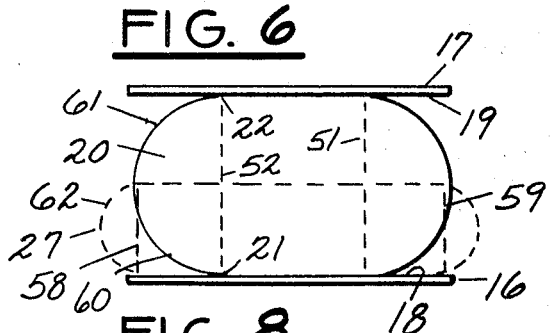
Figure 16:
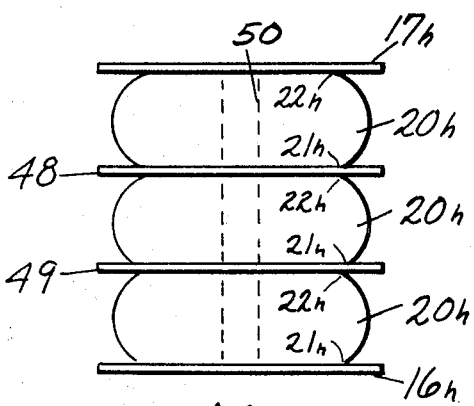
Figure 17:
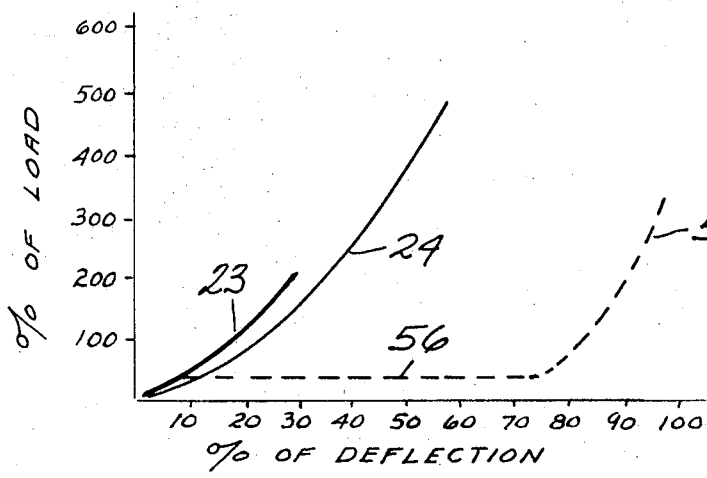
Figure 18:
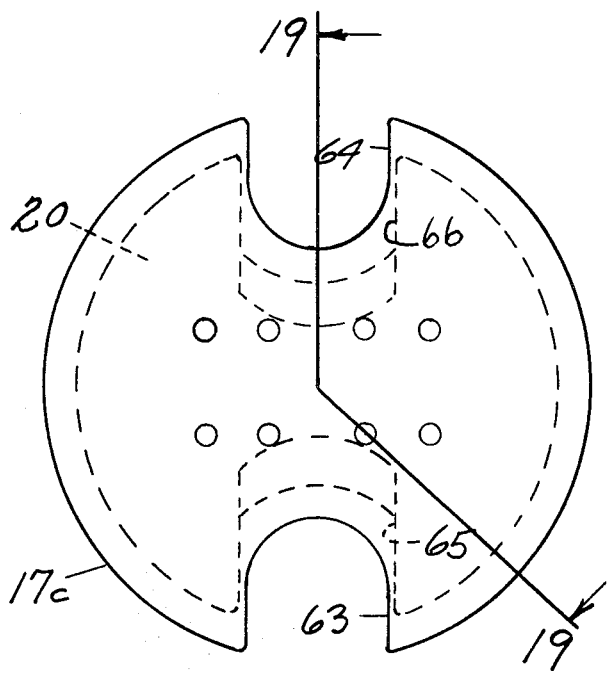
Figure 19:
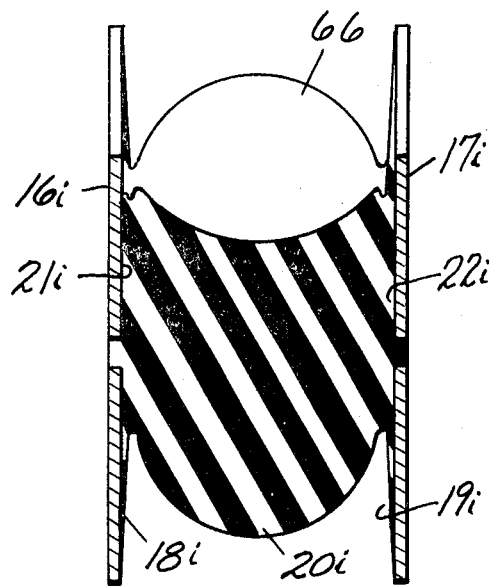

FIGS. 3 and 4 are diagrams showing the deflection of the elastomer of the FIG. 1 mounting under load, FIGS. 5 and 6 are views similar to FIGS. 3 and 4 showing the deflection of the FIG. 1 mounting modified to have a center hole, FIG. 7 is a diagram showing the deflection of a mounting in which the elastomer has a relation between the cross section and length such that it buckles under compression load, FIG. 8 is a side elevation of one embodiment of a compression-type mounting, FIGS. 9 through 16 are respectively side elevations of additional modifications of the invention, FIG. 17 is a diagram of load deflection curves, FIG. 18 is an end view of another modification, and FIG. 19 is a section on line 19-19 of FIG. 18.

In FIG. 1 is shown a conventional compression-type elastomeric spring having supporting and supported members 1 and 2 with load-carrying surfaces 3 and 4 opposed to each other and bonded to opposite ends of a body 5 of elastomer of uniform cross-sectional area. This is a common type of compression spring. When placed under vertical load causing the elastomer to deflect to substantially 80 percent of its height, the member 2 moves to the position indicated by dotted line 2a and the elastomer being incompressible bulges outwardly as indicated by curved lines 6. FIGS. 3 and 4 show the stress pattern in a radial plane through the axis of the body. In going from the unloaded condition shown in FIG. 3 to the fully loaded condition shown in FIG. 4, the squares of FIG. 3 are distorted. As the upper and lower sides of the squares approach each other, the outermost side of each square is forced radially outwardly. FIGS. 3 and 4 show the stress patterns for a solid body of elastomer. FIGS. 5 and 6 show the same stress patterns for a body of elastomer having a center hole 7. It will be noted that the same kind of distortion takes place. The top and bottom sides of the squares approach each other. The sides adjacent the hole 7 do not move radially so that the hole has substantially the same diameter in the fully loaded condition of FIG. 6 that it had in the unloaded condition of FIG. 5. The outer sides of the squares are squeezed radially outward. The reason for outward movement is that movement toward the center or axis of the body would require the elastomer to be compressed or wedged to a smaller diameter while outward movement is resisted only by hoop tension in the elastomer. Since elastomers are about three times as easy to move in tension as i compression, the elastomer moves along the path of least resistance, or outward. Center holes such as 7 are frequently present for through or safety bolts. In the mounting of FIG. 1 either with or without the center holes, it has been observed that if the load is sufficient to deflect the body 5 more than 20 percent of its unloaded height, the mounting tends to fail under dynamic or repeated loading, the failure being of a fatigue nature starting by tearing at the outer edges of the bond between the elastomer and the load-carrying surfaces 3 and 4. The failure is a tearing of the elastomer and may start at any point around its outer periphery in the regions indicated by numeral 8. Once the failure starts, it progresses radially inward and the characteristics of the mounting are impaired so that its useful life is ended.

Figure 2:
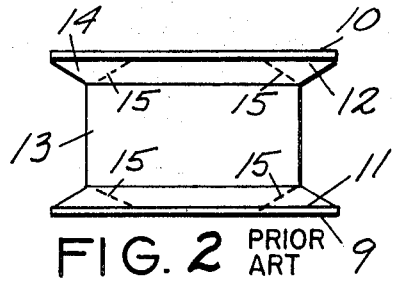
FIG. 2 is a side elevation of another prior-art compression-type mounting.

In an attempt to extend the useful life of the compression-type elastomeric mounting, the structure of FIG. 2 has been used where supporting members 9 and 10 having load-carrying surfaces 11 and 12 are bonded to opposite ends of a body 13 of elastomer. The body 13 is of uniform cross-sectional area through its midportion but adjacent each of its ends is an outwardly extending reinforcement 14 which provides an enlarged bond area between the elastomer and the members 9 and 10. The mounting of FIG. 2 is an improvement over the mounting of FIG. 1 but it has essentially the same load-carrying limitation, namely, that in order to obtain a useful life, the load should not deflect the elastomer more than 20 percent of its unloaded height. When this load limit is exceeded, failure of the elastomer starts along the regions indicated by dotted lines 15, in each case starting at the outside and progressing radially inward.

FIG. 8 shows one embodiment of this invention in which supporting and supported members 16 and 17 have load-carrying surfaces 18 and 19 bonded to opposite ends of a body 20 of elastomer. The ends 21 and 22 are of reduced cross-sectional area compared to the maximum cross-sectional area midway between the members. In the particular spring shown, the cross-sectional area of the ends 21 and 22 is approximately one-fourth the maximum cross-sectional area.

FIG. 17 shows at 23 the load deflection curves for the prior-art compression springs of FIGS. 1 and 2. In the prior-art compression spring at full load or 100 percent, the body of elastomer has been compressed about 20 percent of its unloaded height. This is near the largest static load which can be carried and at the same time obtain acceptable life under superimposed dynamic and shock loading. Temporary static overloads may be carried without substantial injury but if these overloads are carried throughout the life of the mounting, it will be found that the life has been greatly shortened. In the load deflection curve 24 for the mounting of FIG. 8, it will be noted that the spring rate starts at a more gradual rate for light loads. This is the effect of the reduced cross-sectional area of the ends of the body 20 of elastomer which cause the effective load-carrying area to be reduced so the elastomer is more easily deflected, thereby producing a softer spring. At 50 percent deflection, the load is 400 percent of that which can be steadily carried by the prior-art mountings, FIGS. 1 and 2 having the same volume of elastomer as the FIG. 8 mounting. This four-fold increase in load-carrying ability is not obtained by sacrificing life. In fact, the life of the FIG. 8 mounting when carrying a static load causing a deflection of 50 percent of its unloaded height is equal to or greater than the prior-art mountings of FIGS. 1 and 2 when carrying static loads causing deflection of 20 percent of the unloaded height. At 35 percent deflection, the static load which can be carried by the FIG. 8 mounting is 200 percent of that which can be steadily carried by the prior-art mountings, FIGS. 1 and 2 having the same unloaded height and the same volume of elastomer as the FIG. 8 mounting. This provides a greater load-carrying capacity with a larger factor of safety for overloads. At 50 percent deflection, the static load rating of the FIG. 8 mounting is 400 percent that of the prior-art mounting of the same unloaded height and the same volume of elastomer.

FIGS. 9—15 inclusive and 18, 19 show variations of the basic FIG. 8 mounting, all having essentially the same or similar properties. In these figures, the corresponding parts are indicated by the same reference numerals with letter subscripts. The load deflection curves for these mountings and the life characteristics are all comparable with the FIG. 8 mounting.

Figure 9:
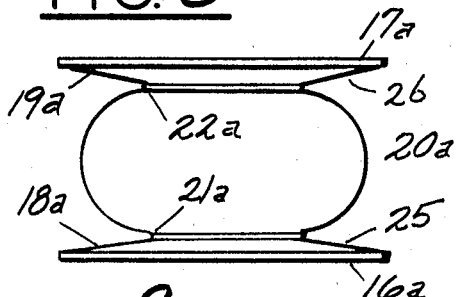

The FIG. 9 spring is intended to simplify the mold construction. In FIG. 8 it will be noted that there is a sharp angle between each of the ends of the body of elastomer and the adjacent supporting and supported members. This requires a sharp cutoff in the mold to mate with the supporting and supported members 16, 17 which are separate pieces of structural material such as metal to which the elastomer is to be bonded. These members are shaped to meet the requirements of the load to be carried and may differ considerably from the simple elementary shapes as shown in FIG. 8. In order to simplify the mold construction, thin skins 25, 26 of elastomer are provided between the ends 21a, 22a of the body 20a of elastomer and the adjacent supporting and supported members 16a and 17a. The skin of elastomer may take the form of a thin wedge-shaped section as shown in FIG. 9 or any other convenient shape. The thickness of these skins of elastomer is insufficient to affect the load-carrying characteristics of the mounting which remain substantially the same as in FIG. 8. The advantage of this construction is solely in simplifying the manufacture. When carrying a load causing deflection to 50 percent of the unloaded height, the shape of the mounting of FIG. 9 is the same as that shown in dotted lines 27 in FIG. 8. In the FIG. 8 mounting at 50 percent deflection the elastomer has rolled down into contact with the load-carrying surfaces 18 and 19. In the FIG. 9 mounting the elastomer for the same deflection will have rolled down into contact with load-carrying surfaces 18a and 19a Since the load-carrying surfaces 18a and 19a are covered with skins 25 and 26 of rubber, there will be rubber to rubber contact between the body 20a and the skins 25, 26 but while this may cause some chafing of the contacting surfaces, the overall life of the mounting will not be significantly affected.

Figure 10:
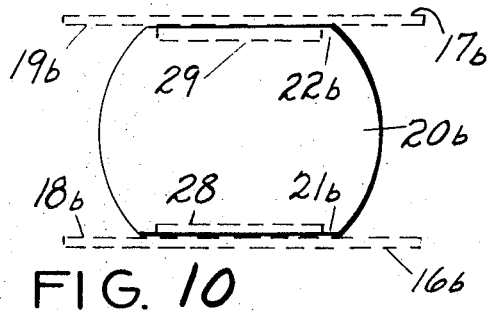

In FIG. 10, the body 20b of elastomer has metal members 28, 29 in the form of relatively thin plates embedded in and bonded to its ends 21b, 22b. The outer surfaces of the plates 28, 29 are flush with the ends 21b, 22b of the body 20b of elastomer. In use the plates 28, 29 are attached to supporting and supported members 16b, 17b shown in dotted lines and having load-carrying surfaces 18b19b radially outside the ends 21b, 22b against which the elastomer rolls down under load. The FIG. 10 spring may be used in combination with a wide variety of load-carrying surfaces of different sizes and shapes. At full load, the body 20b of elastomer has the same shape shown at 27 in FIG. 8.

Figure 11:
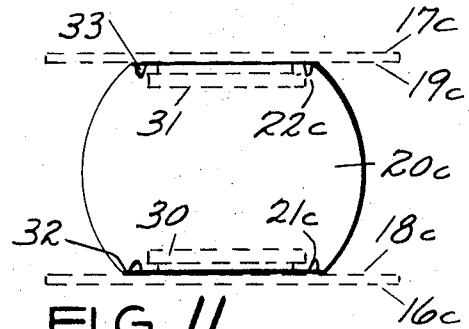

The spring of FIG. 11 is similar to the spring of FIG. 10 differing in that the plates 30 and 31 which correspond to the plates 28 and 29 are recessed slightly into the ends 21c and 22c of the body 20c of elastomer so that when the plates are attached to supporting and supported members 16c and 17c an upstanding lip 32, 33 is pressed into contact with the load-carrying surfaces 18c, 19c. When the spring is fully loaded, it assumes the shape shown at 27 in FIG. 8 and the lips 32 33 are well toward the center of the spring so that the mass of elastomer surrounding the lips protects the bond between the elastomer and the plates 30,31 from any objectionable strain. The advantage of the FIG. 11 spring over that shown in FIGS. 8 and 9 is in simplifying the mold construction.

Figure 12:
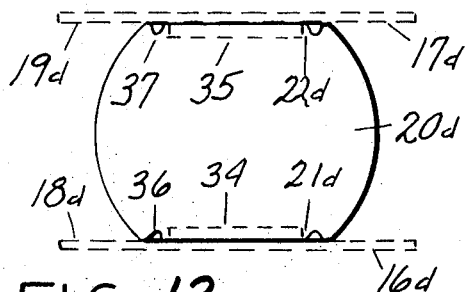

The spring of FIG. 12 is similar to the spring of FIG. 11 except that the metal end plates 34 and 35 bonded into the ends 21d and 22d of the body 20d of elastomer are surrounded by grooves 36, 37 which prevent any stress on the bond between the elastomer and the plates 34, 35 as the plates are attached to supporting members 16d and 17d. Such stresses might result from inequalities of the load-carrying surfaces 18d, 19d or from manufacturing tolerances. The load deflection characteristics and life of the FIG. 12 mounting are the same as those of the mountings of FIGS. 8—11 inclusive.

Figure 13:
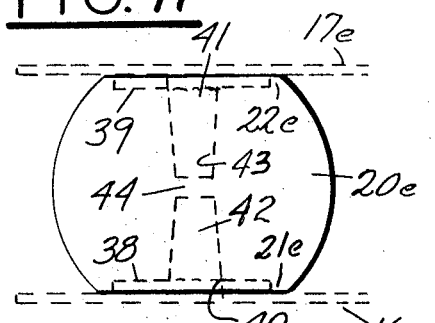

The spring of FIG. 13 is similar to FIG. 10 except that the metal plates 38, 39 bonded in the ends 21e and 22e of the body 20e have holes 40, 41 for core pins which form cavities 42, 43 in the body of elastomer. The cavities are separated by a web 44. The purpose of the cavities may be to receive locating means such as pins on the supporting and supported members 16e and 17e. Another advantage of the cavities 41 and 42 is that the core pins transfer heat into the center of the body 20e of elastomer to aid in vulcanizing. The cavities 42 and 43 do not significantly effect the load deflection curves which are in substance the same as those for the mountings of FIGS. 8—12 inclusive.

Figure 14:
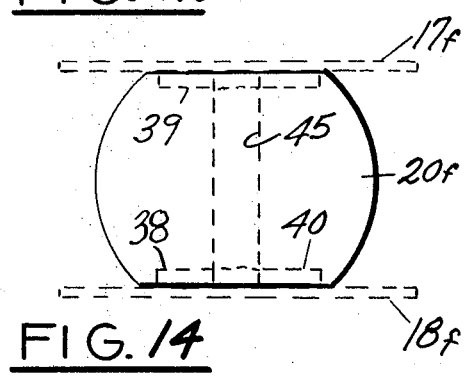

The FIG. 14 mounting is identical with FIG. 13 except that the web 44 has been omitted so that the body 20f of elastomer has a center hole 45 for a through bolt by which the spring may be safetied.

Figure 15:
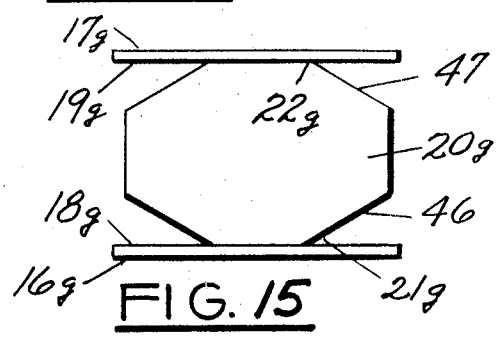

The springs of FIGS. 8—14 inclusive have had external convex or generally spherical surfaces meeting the end plates at an acute angle. In FIG. 15 the body 20g of elastomer has bevelled end surfaces 46, 47 converging at an acute angle toward end surfaces 21g, 22g bonded respectively to the load-carrying surfaces 18g and 19g of supporting and supported members 16g and 17g. The angle between the bevelled surfaces 46, 47 and the adjacent load-carrying surfaces 18g and 19g is an acute angle so that as the elastomer bulges outward under compression load, it rolls down into contact with the load-carrying surfaces and protects the bond to the supporting and supported members in the same manner as the spherical surfaces of the previously described springs. The load deflection curve of the FIG. 15 mounting is substantially the same as the load deflection curve of the mountings of FIGS. 8—14 inclusive.

FIG. 16 shows several springs each having a construction similar to FIG. 8 stacked one on top of the other to provide an assembly capable of greater deflection. The mounting of FIG. 16 comprises three bodies 20h stacked one on top of the other and each having ends 21h, 22 h sandwiched between and bonded to pairs of spaced end plates corresponding in function and structure to the supporting and supported members 16 and 17 of FIG. 8. In the particular construction shown in FIG. 16 where the entire assembly is to be molded and bonded at the same time, there is a bottom plate 16h and a top plate 17h for attachment to supporting and supported members and there are intermediate plates 48, 49 each common to two adjacent bodies of elastomer. If the assembly shown in FIG. 16 were made of three separately molded units stacked one on top of the other, the plates 48 and 49 would each consist of two plates which may be fastened together. Extending through the centers of the plates and through the centers of the bodies 20h of elastomer is a center hole 50 which may receive a center bolt or rod serving one or more functions such as a preload device, a safety device, a rebound-limiting device, etc. The center bolt may also serve to guide the vertical deflection of the elastomer.

The mountings of FIGS. 8—16 inclusive are usually made of bodies of elastomer having regular cross section such as circular, elliptical, oval, elongated, etc. In FIGS. 18 and 19, the body 20i of elastomer is of FIG. 8 or dumbbell cross section with ends 21i, 22i of reduced cross-sectional area bonded to load-carrying surfaces 18i, 19i of metal plates 16i, 17i. At diametrically opposite sides, the plates 16i, 17i have reentrant grooves 63, 64 registering with the ends of similar axially extending grooves 65, 66 in the elastomer. As in the other mountings, the elastomer is of largest cross-sectional area between its ends and converges toward the load-carrying surfaces at an acute angle in accordance with the same principles for preventing stress concentration. Under load, the elastomer bulges outward and rolls down into contact with the load-carrying surfaces. In order to provide space for the outwardly bulging elastomer, the grooves 65, 66 are of concave shape as molded having greatest depth at the center and least depth at the ends. Under load, the elastomer bulges outward and makes the grooves 65, 66 of more nearly uniform depth throughout. The purpose of the grooves 63—66 is to provide clearance required by space limitations. This is done without changing the basic characteristics of the mounting which are substantially the same as the mountings of FIGS. 8—16 inclusive.

The springs of FIGS. 8—16 inclusive and 18, 19 have the same or similar modes of operation and have the largest known energy capacity and longest life per pound of spring weight. By virtue of the spring design, a long life can be expected in spite of the abnormally large dynamic compression stresses and strains. The elastomer contour reduces the amount of stress and strain concentration in the vicinity of where it is bonded to load-transmitting and -receiving surfaces of more rigid materials, such as metal plates. The elastomer contour permits abnormally large compression strains without serious localized high-stress concentrations anywhere in the elastomer. In a test of the spring of FIG. 8 loaded to substantially half its initial or unloaded height, no evidence of failure showed up after nearly 300,000 cycles of such loading.

Several factors contribute to this improvement. Under load, the elastomer bulges outward or rolls over the load-carrying surfaces to which the ends are bonded. This action starts at light loads. The acute angle between the elastomer and the plates permits the elastomer to bulge or roll out over the bond edge before very much stress has built up at the edge of the bond between the elastomer and load-carrying surfaces. Increasing the load still further causes little increase to stress or strain at the bond edge, partly because the elastomer that has rolled over on the plate to protect the bond and partly because the strain in the elastomer becomes uniformly distributed. The elastomer that has rolled over on the plate now carries more load and the load-carrying area is greater. This change occurs whenever the load is increased. Even at high loads, the region of highest stress and strain is the bulged outer exposed surface of the elastomer. But here again, stress concentrations are not severe because there is no specific restriction point to bulging.

The stiffness or spring rate of the spring increases with load so that a spring which provides an adequate cushion for heavy load will not be too stiff for a light load. For example, referring specifically to FIG. 8, at light loads, the load is applied primarily through the reduced area ends 21, 22 and the stiffness is comparable with that of a column of elastomer between dotted lines 51 and 51. As the load increases, the arcuate surfaces 53, 54 roll 18 into contact with the load-carrying surfaces 18, 19 thereby increasing the cross section of elastomer in load-carrying relation between the surfaces and correspondingly increasing the stiffness. In the fully loaded position shown in dotted lines 17 in FIG. 8 there is a solid cylindrical column of elastomer between dotted lines 58, 59 which is significantly larger in diameter than the column of elastomer between the dotted lines 51, 52 and has significantly larger load-carrying area. It will be noted that the convex or semispherical outer end surfaces 60, 61 have in effect rolled down upon the adjoining load-carrying surfaces 18, 19. There has also been a bulging of the midsection or waist of the elastomer to the diameter indicated by the numeral 62. In the dotted line position the volume of elastomer is unchanged but the shape of the elastomer has been changed to present a larger cross section of elastomer to the load and to prevent points of stress concentration which could cause premature failure. This action of progressively increasing the contact area is essentially independent of the nature of the load-carrying surfaces 18, 19. Essentially the same characteristics are obtained whether the surfaces 18, 19 are rough or smooth or whether lubricated or dry. Apparently, as soon as contact is made, the elastomer assumes a load-carrying relation and there is essentially no tendency for the elastomer to slip along the surfaces. This may be due to the fact that the maximum stress intensity in the rubber is always in the peripheral surfaces midway between the ends of the body. The stress in this region is in the nature of hoop tension which acts in the direction to hold the incompressible rubber in contact with the load-carrying surfaces 18,19. Or this may be due to the broad distribution of strain along the contact surfaces between the load-carrying surfaces and the elastomer.

To obtain long life at high strain, the following structural characteristics should be observed: First, the column of elastomer should have a relation between the length and cross section which will prevent buckling under compression (Applied Mechanics, Fuller and Johnston, Vol. II, copyright 1919, pp. 21, 346—364). The harmful effects of buckling are shown diagrammatically in FIGS. 7 and 17. The body of elastomer 53 in FIG. 7 has its ends bonded to metal plates 54, 55. Because the ratio of height to width is high (4 to 1), there is a pronounced tendency for the elastomer to buckle to a C shape as shown in dotted lines. As soon as buckling starts, load is carried in bending and is no longer carried in compression. Since the elastomer is very weak in bending as compared to compression, the load deflection curve follows the almost horizontal dotted line 56 until the sides of the C close against each other and place the elastomer in direct compression between the plates 54, 55 at which time the load deflection curve rises along dotted line 57. The low load-carrying ability of the spring during buckling is undesirable. For a cylinder of elastomer of uniform cross section the length or height should be no greater than twice the diameter. Buckling reduces the load-carrying ability. The critical dimensions at which buckling takes place are well understood in the art and are empirically derived. Second, the cross-sectional area of the column of elastomer effective for light loads should be substantially less than, e.g. from one-tenth to one-half, the maximum cross-sectional area between the ends. In FIG. 8, the area for light loads is about one-fourth the maximum cross-sectional area midway between the ends. Third, the ends of the elastomer should diverge from the load-carrying surfaces at an angle such that under load the elastomer rolls or in laid down into contact with the load-carrying surfaces. An average angle of from 15°—45° is acceptable. For convex or arcuate surfaces such as shown in FIG. 8, the angle should be measured midway between the ends of the arc. Fourth, the included volume between the projection of the elastomer on the load-carrying surfaces at no load and the adjacent end surfaces of the elastomer should be less than the volume of elastomer displaced when compressed under full load. The idea is to establish load-carrying contact with the ends of the elastomer in such a manner as to avoid stress concentration adjacent the load-carrying surfaces.

Elastomers are virtually incompressible so that the shape of the elastomer under load maintains the volume constant. In a conventional compression mounting where the elastomer is of substantially cylindrical shape, dynamic strains of more than 15 percent to 20 percent cause points of stress concentrations at which the elastomer tears and loses its load-carrying ability. The points of stress concentration are at or near the outer edges of the bond between the elastomer and the end plates. In the present mounting, stress concentration adjacent the bond between the elastomer 20 and the load-carrying surfaces is avoided by having the outer surface of the elastomer diverge from the end plates at an acute angle. By means of this end shape, before the load in the elastomer reaches values which could cause excessive localized strain, the elastomer rolls down against the end plates around the end sections 21, 22 and protects the bond to the end sections from excessive stress. By means of this end shape, the permissive strain for steady-state operation is raised from a maximum of 20 percent to a maximum of 35 percent or more. That is, while conventional elastomeric compression mountings can stand operation while carrying loads which deflect the elastomer of 20 percent of its height, the present mounting can stand operation at loads which deflect the elastomer 35 percent or more of its height. This allows a substantial factor of safety for long-time operation while carrying loads deflecting the elastomer in the range of 35 percent or more of its height and at the same time allows for overloads due to intermittent shocks which cause even greater deflection.

The shape of the bodies is not critical so long as the elastomer is in direct compression relationship between the load-carrying surfaces and the dimensions are such as to avoid buckling. Bodies of spherical and doughnut shape with circular, oval and elliptical cross section have been used. The smaller the angle between the ends of the elastomer and the adjacent load-carrying surfaces, the less bending of the elastomer in this area as the compression load is applied to the spring. Also, the smaller the ratio of area of the ends to the maximum cross-sectional area, the lower the tension and shear at the outer edge of the bond. With a small angle and a large area ratio, not very much stress or strain builds up at the bond or contact area before this edge is covered by elastomer bulging and rolling out as the load increases. Increasing the load still further causes little increase to stress or strain at the bond or contact surface edge, primarily because the elastomer that has rolled over the edge and acts as a restriction. The elastomer that has rolled over on the load-carrying surfaces now carries load also and the load-carrying area is greater. This change occurs whenever the load is increased. Even at high loads, the region of highest stress and strain is the bulged outer exposed surface of the elastomer. But here again, stress concentrations are not severe because there is no specific restriction point to bulging.

I claim:

1. A compression spring arrangement comprising a column of elastomer in compression load-carrying relation, said column having ends of reduced cross-sectional area and having a relation between length and cross section which ill prevent buckling under compression load applied between its ends, supporting and supported members at opposite ends of the column and having load-carrying surfaces in opposed relation to each other and bonded to and each projecting radially outside the associated end of the column, the surface of the column adjacent each end diverging outward from the adjacent load-carrying surface at an acute angle so that said elastomer under compression load bulges outward and rolls down into load-carrying contact with the adjacent load-carrying surfaces outside the outer edge of its bond to the adjacent load-carrying surface and increases the load-carrying area of the column presented to the adjacent load-carrying surface and prevents stress concentration in the elastomer adjacent said bond.

2. The spring of claim 1 in which the outer surfaces of the column adjacent one end are convex.

3. The spring of claim 1 in which the outer surfaces of the column adjacent one end are semispherical and tangent to the associated load-carrying surface.

4. The spring of claim 1 in which the outer surfaces of the column adjacent one end are bevelled.

5. The spring of claim 1 in which the column of elastomer has a center hole extending axially inward from one end.

6. The spring of claim 1 in which the area of one end of the column is not greater than substantially half the maximum cross section of the column between the ends.

7. The spring of claim 1 in which the height of the column is not substantially greater than its maximum diameter.

8. The spring of claim 1 in which the column has an external groove extending axially between the ends of the column.

9. The spring of claim 8 in which the depth of the groove is greater between the ends of the groove.

10. The spring of claim 1 in which at least one of the load-carrying surfaces comprises a metal part coextensive with the bond to the column and a separate part radially outside the bond 11. The spring of claim 1 in which surrounding the bond between the load-carrying surface of one of said members and the associated end of the column there is an adjoining skin of elastomer of wedge shape cross section extending radially outside said bond and bonded to said load-carrying surface.

12. The spring of claim 10 in which said metal part is recessed into the column so as to have outer surfaces substantially flush with the associated end of the column.

13. The spring of claim 10 in which the metal part is surrounded by a groove in the elastomer extending axially into the associated end of the column.

Disclaimer 3,584,858.—*Merrill G. Beck*, Erie, Pa. COMPRESSION SPRING. Patent dated June 15, 1971. Disclaimer filed Oct. 18, 1971, by the assignee, *Lord Corporation*.

Hereby disclaims the terminal portion of the patent subsequent to July 22, 1986.

[*Official Gazette December 14, 1971.*]